(12) United States Patent
Da Silva Gameiro et al.

(10) Patent No.: US 12,069,472 B2
(45) Date of Patent: Aug. 20, 2024

(54) METHOD, TRANSMITTER DEVICE AND RECEIVER DEVICE FOR SECURING CHANNEL TRAINING ON A POWER DOMAIN NON-ORTHOGONAL MULTIPLE ACCESS SYSTEM

(71) Applicants: UNIVERSIDADE DE AVEIRO, Aveiro (PT); INSTITUTO DE TELECOMUNICAÇÕES, Aveiro (PT)

(72) Inventors: Atílio Manuel Da Silva Gameiro, Aveiro (PT); Daniel Filipe Marques Castanheira, Aveiro (PT); Adão Paulo Soares Silva, Aveiro (PT); Gustavo Miranda Castilho Anjos, Águeda (PT)

(73) Assignees: INSTITUTO DE TELECOMUNICAÇÕES, Aveiro (PT); UNIVERSIDADE DE AVEIRO, Aveiro (PT)

( * ) Notice: Subject to any disclaimer, the term of this patent is extended or adjusted under 35 U.S.C. 154(b) by 408 days.

(21) Appl. No.: 17/622,971

(22) PCT Filed: Jun. 29, 2020

(86) PCT No.: PCT/IB2020/056133
§ 371 (c)(1),
(2) Date: Dec. 27, 2021

(87) PCT Pub. No.: WO2020/261243
PCT Pub. Date: Dec. 30, 2020

(65) Prior Publication Data
US 2022/0256334 A1    Aug. 11, 2022

(30) Foreign Application Priority Data
Jun. 28, 2019    (PT) .......................................... 115616

(51) Int. Cl.
*H04K 3/00* (2006.01)
*H04K 1/00* (2006.01)
(Continued)

(52) U.S. Cl.
CPC ............ *H04W 12/03* (2021.01); *H04K 1/006* (2013.01); *H04K 3/825* (2013.01); *H04J 99/00* (2022.08); *H04L 27/18* (2013.01); *H04L 27/34* (2013.01)

(58) Field of Classification Search
CPC ....... H04W 12/03; H04K 1/006; H04K 3/224; H04K 3/226; H04K 3/825; H04B 1/02; H04B 1/06
See application file for complete search history.

(56) References Cited

U.S. PATENT DOCUMENTS 9,450,658 B1 *   9/2016   Moon ................. H04B 7/0486
2016/0248582 A1   8/2016   Ashrafi et al.
(Continued)

FOREIGN PATENT DOCUMENTS

CN    108834113 A    11/2018
WO    2012/044855 A2    4/2012

OTHER PUBLICATIONS

Zhang et al., "Secrecy Sum Rate Maximization in Non-orthogonal Multiple Access", IEEE Comm. Letters, May 2016, pp. 930-933, vol. 20, No. 5.
(Continued)

*Primary Examiner* — Tuan Pham
(74) *Attorney, Agent, or Firm* — Leason Ellis LLP

(57) ABSTRACT

Secure channel training to enhance the confidentiality level of a power domain non-orthogonal multiple access (NOMA) communication system when impaired by eavesdropping attacks coming from inside and outside of the network. In a first scenario, a cooperative jammer available in the system
(Continued)

defines an external source of entropy that is independent of the channel variation rate. While the jammer provides secrecy inside the network, the proposed invention is configured to secure the network from outside, encoding the system information, which is exchanged during the training phase, using only the channel state. In a second scenario, the cooperative jammer is not available; with the secrecy inside and outside of the network ensured through a different parameterization. That parameterization is done in a way that the required system information is encoded using not only the channels, but also a random phase defined in the data communication phase.

12 Claims, 7 Drawing Sheets

(51) Int. Cl.
| | |
|---|---|
| *H04W 12/03* | (2021.01) |
| *H04J 99/00* | (2009.01) |
| *H04L 27/18* | (2006.01) |
| *H04L 27/34* | (2006.01) |

(56) References Cited

U.S. PATENT DOCUMENTS

2018/0167237 A1\* 6/2018 Gudovskiy ............ H04W 24/02
2019/0173540 A1\* 6/2019 Kotecha ............... H04B 7/0634

OTHER PUBLICATIONS

Biao et al., "On the Design of Secure Non-Orthogonal Multiple Access Systems", IEEE J. Sel. Areas Commun., Oct. 2017, pp. 2196-2206, vol. 35, No. 10, doi:10.1109/JSAC.2017.2725698, XP011660237.
Lei et al., "On Secure NOMA Systems With Transmit Antenna Selection Schemes", IEEE Access, Aug. 2017, pp. 17450-17464, vol. 5, doi:10.1109/ACCESS.2017.2737330, XP011660490.
Jiang et al., "SIC-Based Secrecy Performance in Uplink NOMA Multi-Eavesdropper Wiretap Channels", IEEE Access, Apr. 2018, pp. 19664-19680, vol. 6.
Chen et al., "Physical Layer Security for Cooperative NOMA Systems", IEEE Trans. Veh. Technol., May 2018, pp. 4645-4649, vol. 67, No. 5.
Liu et al., "Enhancing the Physical Layer Security of Non-Orthogonal Multiple Access in Large-Scale Networks", IEEE Trans. Wireless Commun., Mar. 2017, pp. 1656-1672, vol. 16, No. 3.
Gustavo et al., "Securing Non-Orthogonal Multiple Access Systems Against Simultaneous Eavesdropping Attacks Coming from Inside and Outside of the Network", 2019 IEEE 30th Annual International Symposium on Personal, Indoor and Mobile Radio Communications (PIMRC), IEEE, Sep. 8, 2019, p. 1-7, XP033662847, DOI: 10.1109/PIMRC.2019.8904169.
Zeng et al., "Securing Downlink Massive MIMO-NOMA Networks With Artificial Noise", Jun. 2019, pp. 685-699, vol. 13, No. 3, XP011725308, DOI: 10.1109/JSTSP.2019.2901170, ISSN: 1932-4553.
Feng et al., "Secure Transmission to the Strong User in Non-Orthogonal Multiple Access", Dec. 2018, pp. 2623-2626, vol. 22, No. 12, XP011699240, DOI: 10.1109/LCOMM.2018.2877320, ISSN:1089-7798.
Liu et al., "Non-Orthogonal Multiple Access for 5G and Beyond", arxiv.org, Cornell University Library, 201 OLIN Library Cornell University Ithaca, NY 14853, Aug. 2018, XP081411284.

\* cited by examiner

METHOD, TRANSMITTER DEVICE AND RECEIVER DEVICE FOR SECURING CHANNEL TRAINING ON A POWER DOMAIN NON-ORTHOGONAL MULTIPLE ACCESS SYSTEM

CROSS-REFERENCE TO RELATED APPLICATIONS

This application is a U.S. National Stage Application under 35 U.S.C. § 371 of International Patent Application No. PCT/IB2020/056133, filed Jun. 29, 2020, which claims priority to Portugal Patent Application No. 115616, filed Jun. 28, 2019, the contents of which are each hereby incorporated by reference in their respective entireties.

TECHNICAL FIELD

The present disclosure relates to wireless communications, more particularly to the field of physical layer security, where the randomness available in the wireless medium is exploited to enhance the confidentiality level of wireless systems, for securing channel training on a power domain non-orthogonal multiple access, NOMA, system.

BACKGROUND

In (Yi Zhang, Hui-Ming Wang, Qian Yang and Zhiguo Ding, "Secrecy Sum Rate Maximization in Non-orthogonal Multiple Access," IEEE Comm. Letters, vol. 20, no. 5, pp. 930-933, May 2016), optimal power allocation schemes were developed with the aim of maximizing the secrecy sum-rate of a NOMA system where multiple users are affected by the presence of a passive eavesdropper. Taking into account secrecy constraints imposed by the existence of an external eavesdropper, the optimality condition of a non-orthogonal system was studied in (Biao He, An Liu, Nan Yang and Vincent K. N. Lau, "On the Design of Secure Non-Orthogonal Multiple Access Systems," IEEE J. Sel. Areas Commun., vol. 35, no. 10, 2196-2206, October 2017) considering a parametrization in terms of decoding order, individual transmission rates and power distribution. The problem of secrecy optimization for different transmit antenna selection strategies was formulated in (Hongjiang Lei, Jianming Zhang, Ki-Hong Park, Peng Xu, Imran Shafique Ansari, Gaofeng Pan, Basel Alomair and Mohamed-Slim Alouini, "On Secure NOMA Systems With Transmit Antenna Selection Schemes," IEEE Access, vol. 5, pp. 17450-17464, August 2017) assuming a two user multiple-input single-output NOMA configuration. While the previous works focus the downlink direction, (Kaiwei Jiang, Tao Jing, Yan Huo, Fan Zhang and Zhen Li, "SIC-Based Secrecy Performance in Uplink NOMA Multi-Eavesdropper Wiretap Channels," IEEE Access, vol. 6, pp. 19664-19680, April 2018) addressed the secrecy performance from the uplink perspective considering eavesdropping collusion. In order to analyze the secrecy impact associated to the integration of cooperative relays in NOMA systems, closed form solutions for the secrecy outage probability and strictly positive secrecy capacity were derived in (Jianchao Chen, Liang Yang and Mohamed-Slim Alouini, "Physical Layer Security for Cooperative NOMA Systems," IEEE Trans. Veh. Technol., vol. 67, no. 5, pp. 4645-4649, May 2018) taking into account well-known relaying techniques. The authors of (Yuanwei Liu, Zhijin Qin, Maged Elkashlan, Yue Gao and Lajos Hanzo, "Enhancing the Physical Layer Security of Non-Orthogonal Multiple Access in Large-Scale Networks," IEEE Trans. Wireless Commun., vol. 16, no. 3, pp. 1656-1672, March 2017) analyzed the secrecy outage probability of a regular multiuser power domain NOMA system considering an eavesdropper exclusion zone around the BS. In a second scenario, the same authors studied the secrecy improvement obtained when artificial noise is generated at the transmitter side.

One of the limitations of the works mentioned above is associated to the fact that they only consider attacks coming from the outside of the system, where external passive eavesdroppers not registered in the network tap the information of the legitimate users. The secrecy challenge of protecting a power-domain NOMA communication is associated with the intrinsic nature of this kind of techniques, in which the receiver with the strongest channel ( ) should decode first the information intended to the receiver with the weakest channel( ). Hence, the design of a robust secrecy solution for this kind of systems should have into consideration the protection of the network simultaneously against inside and outside eavesdropping attacks. Note that from a practical perspective, it does not make sense to build a security solution only for external passive eavesdroppers if the system is vulnerable from inside, since in this case the attacker only have to register in the network as a legitimate user in order to tap the information that he pretends to acquire. The secure channel training method developed in the scope of the present disclosure was designed as a standalone physical layer security solution that when integrated in a power-domain non-orthogonal communication scenario is capable to protect the system against eavesdropping attacks coming from inside and outside of the network. To the best of the author's knowledge, the development of standalone physical layer security solutions to protect power-domain NOMA systems against these two types of attacks is an open problem that remains untreated in the state of the technique.

These facts are disclosed in order to illustrate the technical problem addressed by the present disclosure.

GENERAL DESCRIPTION

One of the objectives of the present disclosure is to enhance the confidentiality level of wireless communications, more particularly in dynamic channel access scenarios in which the transmission medium is shared by multiple terminals using a power domain non-orthogonal multiple access scheme.

The present disclosure was designed to be implemented in a power domain non-orthogonal multiple access system comprising two distinct scenarios. In the first scenario the system is configured to work with a cooperative jammer (2), which is used to provide protection against eavesdropping attacks coming from inside (3) of the network, being the developed invention applied in this context to extend the protection provided by the cooperative jammer (2) for the case in which the system is also attacked by an undetectable passive eavesdropper (5) located outside of the network. In a second scenario, considering that the cooperative jammer (2) is not available to help in the secrecy process, the present invention adapts to the power-domain non-orthogonal communication signal transmitted by (1) in order to ensure confidentiality inside (3) and outside (5) of the network.

Therefore, the present disclosure is useful to provide a high secrecy service running over a power domain non-orthogonal multiple channel access scheme that requires protection against eavesdropping attacks coming from inside (3) and outside (5) of the network.

In an embodiment, the secrecy level provided by the current higher layer cryptographic solutions is supported by the assumption that some complex mathematical problems, like for instance the integer factorization of the product of two large prime numbers, would take thousands of years to be solved using the conventional computing methods, and therefore, from this perspective we can say that the current cryptographic protocols have a practical reliability. However, the recent emergence of quantum processors weakened the robustness of the assumptions that have been used to support the secrecy provided by these protocols, since with this new technology, the hard mathematical problems that would take thousands of years to be solved with conventional computing, will be handled in some seconds with quantum computing. This change of technological context forced the research community to find alternative solutions to complement or even replace current security protocols, being the development of secrecy schemes supported on the paradigms of physical layer security one of the most promising paths.

The proposed disclosure was designed and evaluated using physical layer security principles and comprises an secure channel training solution that protects a two user non-orthogonal multiple access system against eavesdropping attacks coming from inside (3) and outside (5) of the network. Although not limited, the present disclosure was designed to be used in a dynamic channel context and can be configured to allow the implementation in two distinct scenarios. While in the first scenario (Scenario 1) the proposed disclosure is adapted to be integrated with a cooperative jammer (2), in a second scenario (Scenario 2) the disclosure is configured to work without the jammer. In order to give a deeper understating, the configuration of the proposed disclosure for both scenarios is described separately.

In an embodiment, Scenario 1: In this first application scenario a cooperative jammer (2) is used to protect the system against inside (3) attacks, being the developed disclosure applied in this context to extend the protection provided by the cooperative jammer (2) for the case in which the system is also attacked by an undetectable passive eavesdropper (5) located outside of the network. Therefore, as illustrated in FIG. 1, this communication scenario comprises a time division duplex system composed by two single antenna transmitters (1), (2) and three single antenna receivers (3), (4) and (5). The function of the first transmitter (1) is to send two complex (IQ) superimposed information streams ($d_{E0}$, $d_B$) for the two NOMA receivers (3), (4) registered in the network as legitimate users, respectively. As it is typically applied in power domain NOMA implementations, the receiver with the strongest channel (3) should decode first the information ($d_B$) intended to the receiver with the weakest channel (4), therefore, to internally protect this information, a second transmitter (2) generates a jamming signal ($d_J$) that ensures information confidentiality among the two receivers (3), (4) registered in the system.

In an embodiment, a third receiver (5) not detectable by the network tries to eavesdrop in a passive way also the information ($d_B$) intended to the receiver that has the weakest channel (4). One of the purposes of the developed disclosure is to extend the secrecy level provided by the cooperative jammer (2) also to this third receiver (5) that attacks the system from the outside, ensuring at the same time that the system remains protected from the inside.

In an embodiment, the approach followed in the development of the present disclosure was focused on limiting the amount of channel information that this third receiver (5) can get during the channel training process that precedes the main communication phase. In wireless communications, in order to adapt the transmission to the dynamic nature of the wireless channel, a preliminary channel acquisition process should occur before the main communication phase. With this preliminary channel acquisition, the transmitting and receiving nodes are able to adapt to the channel effects on the transmitted signals, increasing therefore their capacity to correctly decode the desired information. Without considering any specific security method, this channel acquisition phase will also improve the capacity of the attacking nodes to eavesdrop the information exchanged between the legitimate nodes during the communication phase. In the considered communication scenario, a preliminary channel acquisition process should also occur to allow the two transmitters (1), (2) and the weakest receiver (4) to obtain the channel information required for the adaptation to the communication medium. To limit the amount of channel information leaked to the third receiver (5) during this channel acquisition phase, the secure channel training process developed in the present disclosure comprises two steps: in the first step, the two NOMA receivers (3-4) transmit two reference signals (RS) (12),(15) to allow the two transmitters (1-2) to get knowledge of the respective channels; in the second step, the channels estimated (13-14),(16-17) during the first step are fed back (21),(23) to the weakest receiver (4) after applying a signal processing scheme (18-19) that manipulates the phases and magnitudes of this estimations in a way that limited channel knowledge is acquired by the third receiver (5). Through the limitation of channel information knowledge at the third receiver (5), the proposed disclosure ensures also significant information theoretical secrecy at the third receiver (5) using a reduced complexity solution. Therefore, with the integration of the proposed disclosure in the cooperative jamming scenario previously described, the resulting secrecy solution can handle with eavesdropping attacks coming from inside (3) and outside (5) of the network.

In an embodiment, Scenario 2: In the second application scenario the cooperative jammer (2) is not available, being the system secrecy provided by the combination of the disclosure with the non-orthogonal signal generated at the legitimate transmitter. Therefore, as illustrated in FIG. 7, this communication scenario comprises a time division duplex system composed by one single antenna transmitter (44) and three single antenna receivers (45), (46) and (47). The function of the transmitter (44) is to send two complex (IQ) superimposed information streams ($d_{E0}$, $d_B$) for the two NOMA receivers (45), (46) registered in the network as legitimate users, respectively. As it is typically applied in power domain NOMA implementations, the receiver with the strongest channel (45) should decode first the information ($d_B$) intended to the receiver with the weakest channel (46). Therefore, to internally protect this information from eavesdropping at (45), the transmitter (44) generates a random phase $\theta_K$ that is applied to the information signal $d_B$ resulting in a new information signal $d_{B,K}$. Then, the information streams $d_{E0}$ and $d_{B,K}$ are superimposed in order to be transmitted to (45) and (46), respectively. Additionally, a third receiver (47) not detectable by the network tries to eavesdrop in a passive way also the information $d_B$ intended to the receiver that has the weakest channel (46).

In an embodiment, as in the first scenario, in this second application scenario a preliminary channel training process should also occur before the transmission of the superimposed streams $d_{E0}$ and $d_{B,K}$ to (45) and (46), respectively.

With the implementation of this channel training process, the transmitter (44) and the weakest receiver (46) can acquire the required information for the adaptation to the communication system. In the particular case of the weakest receiver (46), the adaptation should be done not only to the communication medium, but also to the random phase $\theta_K$ used in the processing of $d_B$. To protect the system against inside (45) and outside (47) eavesdropping attacks, the secure channel training process developed in the present disclosure is configured to provide channel and encoding information to (46), ensuring at the same time that this information exchange is processed in a way that does not allow (45) and (47) to decode $d_B$. In order to achieve this objective, the secure channel training process developed in the present disclosure comprises two steps: in the first step, the two NOMA receivers (45-46) transmit two reference signals (RS) (51),(53) to allow transmitter (44) to get knowledge of the respective channels; in the second step, the channels estimated (52), (54) and the random phase $\theta_K$ are jointly processed in order to allow a secure fed back (56) of the information required at the weakest receiver (46).

In an embodiment, an important point that should be mentioned is associated to the fact that the proposed disclosure is designed to be implemented in a dynamic channel context, being the maximum transmission rate with which it is possible to ensure at least the claimed secrecy, dependent on the value of the coherence block of the channel, which should preferably be measured during the system initialization.

It is disclosed a transmitter device i for a secure channel training method applied to a power domain non-orthogonal multiple access system comprising a plurality of transmitters and receivers, wherein the transmitter device i is configured to:
estimate the channel between receiver device j and transmitter device i;
estimate the channel between receiver device j+1 and transmitter device i;
apply a channel processing block to encode the estimated channels between transmitter device i and receiver devices j and j+1;
transmit a signal of said encoded channels to receiver device j+1 containing information regarding the estimated channels between transmitter device i and receiver's devices j and j+1.

The transmitter device i may be further configured to apply said channel processing block to the estimated channels between transmitter device i and receiver devices j and j+1, by applying the following encoding operation:

$$x_{F(i)}(k) = F_i[p_H h_{j+1,i}(k), h_{j,i}(k), r(k)] \quad \text{(Eq. 39)}$$
$$= p_H |h_{j+1,i}(k)||h_{j,i}(k)|^{-2}$$
$$e^{j[\theta_{j,i}(k) - 2\theta_{j+1,i}(k) - r(k)\frac{2\pi}{M}]}$$

where $F_i(.)$ in equation (Eq. 39) defines the processing function to be applied, $h_{j,i}(k)$ is the small-scale channel fading coefficient between transmitter device i and receiver device j, $h_{j+1,i}(k)$ is the small-scale channel fading coefficient between transmitter device i and receiver device j+1, $|h_{j,i}(k)|$ is the magnitude of the channel between transmitter device i and receiver device j, $|h_{j+1,i}(k)|$ is the magnitude of the channel between transmitter device i and receiver device j+1,
$\theta_{j,i}(k)$ is the phase of the channel $h_{j,i}(k)$ between transmitter device i and receiver device j, $\theta_{j+1,i}(k)$ is the phase of the channel $h_{j+1,i}(k)$ between transmitter device i and receiver device j+1, $x_{F(i)}(k)$ is the signal to be sent by transmitter device i containing the encoded channels between transmitter device i and receivers devices j and j+1, $p_H$ corresponds to a power allocation coefficient allocated to receiver j+1, r(k) is defined as 0 or as an integer random variable defined in the interval [1, M] wherein M is the order of a digital modulation for which the system is configured, and k defines the system realization index.

It is also disclosed a receiver device j+1 for a secure channel training method applied to a power domain non-orthogonal multiple access system comprising a plurality of transmitters and receivers, wherein the receiver device j+1 is configured to:
receive a signal sent by transmitter device i containing the encoding of estimated channels between transmitter device i and receiver devices j and j+1;
apply a channel acquisition block to the signal containing the encoding of the estimated channels between transmitter device i and receiver devices j and j+1.

The receiver device j+1 may be further configured to apply said channel acquisition block to the signal sent by transmitter device i containing the encoding of the estimated channels between transmitter device i and receiver devices j and j+1, by applying the following decoding operation:

$$R_i[y_{j+1,F(i)}(k), \alpha_{j+1}p_H] = \left(\frac{|y_{j+1,F(i)}(k)|}{\alpha_{j+1}p_H}\right)^{1/2} e^{-j\theta_{j+1,F(i)}(k)} \quad \text{(Eq. 40)}$$
$$= h_{j+1,i}(k)h_{j,i}(k)^{-1} e^{j[r(k)\frac{2\pi}{M}]},$$

where $$y_{j+1,F(i)}(k) = \alpha_{j+1}x_{F(i)}(k)h_{j+1,i}(k) \quad \text{(Eq. 41)}$$
$$= \alpha_{j+1}p_H[|h_{j+1,i}(k)||h_{j,i}(k)|^{-1}]^2$$
$$e^{j[\theta_{j,i}(k) - \theta_{j+1,i}(k) - r(k)\frac{2\pi}{M}]}$$

is the received signal at receiver device j+1 containing the encoding of the channels between transmitter device i and receiver devices j and j+1, $|y_{j+1,F(i)}(k)|$ is the magnitude of the received signal $y_{j+1,F(i)}(k)$, $\theta_{j+1,F(i)}(k)$ is the phase of $y_{j+1,F(i)}(k)$, $\alpha_{j+1}$ defines a constant path-loss coefficient for receiver j+1, $h_{j,i}(k)$ is the small-scale channel fading coefficient between transmitter device i and receiver device j, $h_{j+1,i}(k)$ is the small-scale channel fading coefficient between transmitter device i and receiver device j+1, $p_H$ is a power allocation coefficient allocated to receiver j+1, $|h_{j,i}(k)|$ is the magnitude of the channel between transmitter device i and receiver device j, $|h_{j+1,i}(k)|$ is the magnitude of the channel between transmitter device i and receiver device j+1, $\theta_{j,i}(k)$ is the phase of the channel $h_{j,i}(k)$ between transmitter device i and receiver device j, $\theta_{j+1,i}(k)$ is the phase of the channel $h_{j+1,i}(k)$ between transmitter device i and receiver device j+1, r(k) is defined as 0 or as an integer random variable defined in the interval [1, M] wherein M is the order of a digital modulation for which the system is configured, and k defines the system realization index.

It is also disclosed a system for a secure channel training method applied to a power domain non-orthogonal multiple access system comprising a plurality of transmitters according to the disclosed embodiments and a plurality of receivers according to the disclosed embodiments.

BRIEF DESCRIPTION OF THE DRAWINGS

The following figures provide preferred embodiments for illustrating the disclosure and should not be seen as limiting the scope of invention.

DETAILED DESCRIPTION

Figure 1:
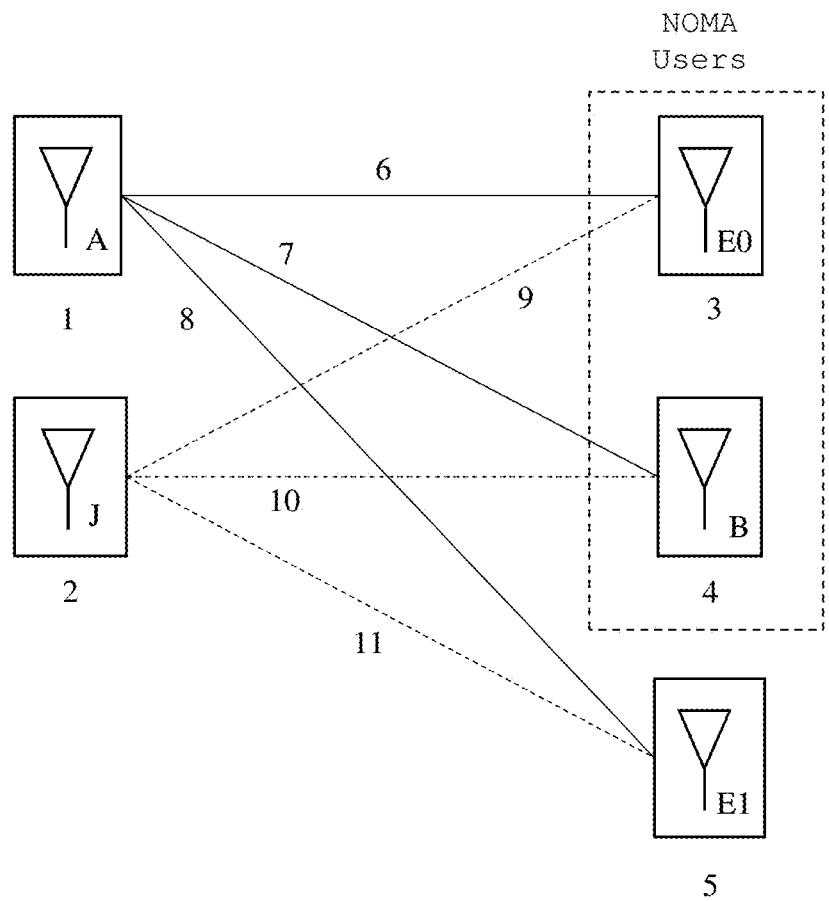
FIG. 1 is a schematic of the wireless communication scenario 1 where the present disclosure is implemented. In the respective schematic, five single antenna terminals are represented, being each one defined as: (1) is a legitimate transmitter; (2) is a cooperative jammer; (4) is the attacked legitimate receiver that is also the NOMA user with the weakest channel; (3) is the eavesdropper that attacks (4) from the inside of the network, being also the NOMA user with the strongest channel; (5) is a second eavesdropper that attacks (4) from outside of the network. Regarding the channel coefficients, (6) is the small-scale channel fading coefficient $h_{E0A}(k)$ between (3) and (1), (7) is the small-scale channel fading coefficient $h_{BA}(k)$ between (4) and (1), (8) is the small-scale channel fading coefficient $h_{E1A}(k)$ between (5) and (1), (9) is the small-scale channel fading coefficient $h_{E0J}(k)$ between (3) and (2), (10) is the small-scale channel fading coefficient $h_{BJ}(k)$ between (4) and (2), (11) is the small-scale channel fading coefficient $h_{E1J}(k)$ between (5) and (2).

The present disclosure relates to a physical layer security technique for wireless communications and comprises a secure channel training method designed to enhance the confidentiality level of a power domain non-orthogonal multiple access (NOMA) communication system when this is impaired by eavesdropping attacks coming from inside and outside of the network. Although not limited to, this disclosure targets two application scenarios. In the first scenario, a cooperative jammer available in the system defines an external source of entropy that is independent of the channel variation rate. While the jammer provides secrecy inside the network, the proposed disclosure is configured to secure the network from outside, encoding the system information, which should be exchanged during the training phase, using only the channel state. In the second scenario, the cooperative jammer is not available; being the secrecy inside and outside of the network ensured through a different parameterization of the proposed disclosure. That parameterization is done in a way that the required system information is encoded using not only the channels, but also a random phase defined in the data communication phase.

In an embodiment, Table 1 contains simulated and theoretical results regarding the secrecy level obtained against the inside attacker (3) when the jamming signal $d_J$ and the information signal $d_B$ intended to (4) are square QAM constellations of the same order M and with similar magnitude scaling. The simulations results regarding the exact value of the mutual information $I(d_B; d_B+d_J)$ are located in the second column of this table. The third column contains a theoretical upper bound defined as $$\overline{I(d_B; d_B + d_J)}.$$

All the mutual information results in this table were normalized to the entropy of $d_B$, which is defined as $\log_2$ (M) for independent and uniformly distributed sources.

TABLE 1

| M | $\dfrac{I(d_B; d_B + d_J)}{\log_2(M)}$ | $\dfrac{\overline{I(d_B; d_B + d_J)}}{\log_2(M)}$ |
|---|---|---|
| 4 | 0.5000 | 0.5850 |
| 16 | 0.3278 | 0.4037 |
| 64 | 0.2341 | 0.3023 |
| 256 | 0.1790 | 0.2385 |
| 1024 | 0.1440 | 0.1955 |
| 4096 | 0.1202 | 0.1648 |

In an embodiment, Table 2 contains simulated and theoretical results regarding the secrecy level obtained against the outside attacker (5) when the jamming signal $d_J$ and the information signal $d_B$ are square QAM constellations of the same order M and with similar magnitude scaling. The results presented in this table were obtained considering a unitary scale parameter for the Rayleigh distributions that define the channel magnitudes $|h_{E1A}(k)|$ and $|h_{BA}(k)|$, being the expected value of $|d_B|^2$ also unitary. In the second column of this table are defined the results of the mutual information $I(|d_B|; \alpha|d_B||h_{E1A}|, \alpha|h_{E1A}||h_{BA}|)$ obtained through simulation using Gaussian kernel functions for estimating probability densities. The third column contains the values of the theoretical upper bound $$\overline{I(|d_B|; \alpha|d_B||h_{E1A}|, \alpha|h_{E1A}||h_{BA}|)}$$

derived in the secrecy evaluation of the proposed disclosure. Since $\alpha = \alpha_{E1} p_H$ is a fixed constant, has no impact in terms of mutual information for this case, which means that the results presented in this table are applicable for any value of $\alpha$ greater than zero. All the mutual information results in this table were normalized to the entropy of $d_B$, which is defined as $\log_2$ (M) for independent and uniformly distributed sources.

TABLE 2

| M | $\dfrac{I(|d_B|;\alpha|d_B||h_{E1A}|, \alpha|h_{E1A}||h_{BA}|)}{\log_2(M)}$ | $\dfrac{\overline{I(|d_B|;\alpha|d_B||h_{E1A}|, \alpha|h_{E1A}||h_{BA}|)}}{\log_2(M)}$ |
|---|---|---|
| 4 | 0.0000 | 0.4953 |
| 16 | 0.1271 | 0.3513 |
| 64 | 0.1019 | 0.2457 |
| 256 | 0.0801 | 0.1863 |
| 1024 | 0.0655 | 0.1494 |
| 4096 | 0.0545 | 0.1245 |

Example 1 represents 2 single antenna legitimate transmitters (1), (2); 2 single antenna legitimate receivers (3), (4); and 1 single antenna passive eavesdropper receiver (5).

In an embodiment, FIG. 1 illustrates an example of an embodiment of the proposed disclosure in a wireless communication system for application Scenario 1. In the considered communication system, node (1) pretends to transmit in secrecy $d_B$ to node (4) and $d_{E0}$ to (3), using for that a power domain non-orthogonal multiple access technique in which (3) is the strongest user and node (4) represents the weakest user. The embodiment illustrated in FIG. 1 considers that the distance between node (1) and (3) is lower than the distance between (1) and (4), therefore, as it is usually defined in the state of art techniques, (3) is the strongest user with node (4) being the weakest user. In power domain non-orthogonal multiple access systems, the strongest user (3) can only reach their intended information after decoding the interference generated by the weakest user (4), being this interference posteriorly cancelled from the overall received signal using a successive interference cancellation (SIC) equalizer. Alternatively, a joint decoding (JD) of interference and information can be also applied using a maximum likelihood (ML) equalizer. Because (3) will decode first the interference created by $d_B$ before accessing the information $d_{E0}$ sent to him, this node (3) will be recognized by the network as a legitimate user that also has the capacity to eavesdrop $d_B$ attacking the network from inside. Additionally, in order to model the occurrence of an outside attack, the embodiment in FIG. 1 also assumes that a passive eavesdropper (5) not registered in the network, and not co-located with (4), tries to tap in an undetectable way the information $d_B$ sent to node (4). The assumption of a passive eavesdropper means that this node listens the communication and does not cause any intentional interference into the legitimate communication channel, staying therefore undetected to the network. Finally, to improve the secrecy level inside of the system, a jammer defined by node (2) cooperates with (1) generating a discrete jamming signal defined by $d_J$. In the remaining of this document, the random variables defined by $h_{RT}$ with $R \in \{E0, B, E1\}$ and $T \in \{A, J\}$ represent small scale channel fading effects which are modelled by zero mean independent complex Gaussian distributions with variance $\sigma_h^2$. The path-loss attenuation between the transmitting nodes T and each one of the receiving nodes (3-5) in R is represented by the coefficients $\alpha_{E0}$, $\alpha_B$ and $\alpha_{E1}$, where it is assumed that $\alpha_B < \alpha_{E0}$. Furthermore, in this embodiment, (1) and (2) are located at the same distance of each one of the other terminals (3-5), therefore, the same path-loss coefficient is applied to model the attenuation between these two terminals (1), (2) and each of the other receiving nodes (3-5). The noise impairment at the receiving node R is represented by $n_R$ and is modelled by zero mean complex Gaussian random variable with variance $\alpha_n^2$. Ideal RF up- and down-conversion is assumed, being the described baseband processing applied to an independent realization of the system denoted by k.

In an embodiment, the non-orthogonal multiple access communication process associated to the embodiment illustrated in FIG. 1 comprises two phases; a preliminary channel training phase (Phase I), and the main communication phase (Phase II). Although the main communication phase happens posteriorly to the training phase, the design of the secure training method associated to the present disclosure depends on the signal structure of the communication phase, hence, we will start by describing the communication phase.

In an embodiment, in the communication phase, the information streams $d_B$ and $d_{E0}$ are sent to the intended receivers, (4) and (3) respectively, in a way that the discrete jamming signal $d_J$ aligns with $d_B$ at node (3), protecting the network from inside attacks when discrete square QAM constellation structures of the same order M are applied for $d_B$ and $d_J$. In order to align $d_B$ with $d_J$ at (3), and assuming that $p_L$, $p_H$ are known power allocation coefficients computed according to the geographic distribution of (3) and (4), the signal transmitted by node (1) is formulated in equation (Eq. 1), being the one transmitted by node (2) defined in equation (Eq. 2).

$$x_A(k) = h_{E0A}^{-1}(k)[p_L d_{E0}(k) + p_H d_B(k)] \quad \text{(Eq. 1)}$$

$$x_J(k) = h_{E0J}^{-1}(k) p_H d_J(k) \quad \text{(Eq. 2)}$$

In an embodiment, since the strongest user (3) is located closer to (1), the amount of power $p_L$ allocated to (3) should be lower than the power $p_H$ allocated to the weakest user (4). Taking into account equations (Eq. 1) and (Eq. 2), the signal observed by node (3) is given by equation (Eq. 3), with equations (Eq. 4) and (Eq. 5) defining the signals observed by (4) and (5), respectively.

$$y_{E0}(k) = \alpha_{E0}[h_{E0A}(k)x_A(k) + h_{E0J}(k)x_J(k)] + n_{E0} \quad \text{(Eq. 3)}$$
$$\alpha_{E0}[p_L d_{E0}(k) + p_H(d_B(k) + d_J(k))] + n_{E0}$$

$$y_B(k) = \alpha_B[h_{BA}(k)x_A(k) + h_{BJ}(k)x_J(k)] + n_B \quad \text{(Eq. 4)}$$
$$= \alpha_B \left[ \begin{array}{c} h_{BA}(k)h_{E0A}^{-1}(k)(p_L d_{E0}(k) + p_H d_B(k)) + \\ h_{BJ}(k)h_{E0J}^{-1}(k)p_H d_J(k) \end{array} \right] + n_B$$

$$y_{E1}(k) = \alpha_{E1}[h_{E1A}(k)x_A(k) + h_{E1J}(k)x_J(k)] + n_{E1} \quad \text{(Eq. 5)}$$
$$= \alpha_{E1} \left[ \begin{array}{c} h_{E1A}(k)h_{E0A}^{-1}(k)(p_L d_{E0}(k) + p_H d_B(k)) + \\ h_{E1J}(k)h_{E0J}^{-1}(k)p_H d_J(k) \end{array} \right] + n_{E1}$$

In an embodiment, in the case of (3), when $\alpha_{E0}p_H$ is much larger than $\alpha_{E0}p_L$, a SIC equalizer can be applied to equation (Eq. 3) in order to get $d_{E0}$. As it is typical of power-domain NOMA systems, first (3) decodes $d_B+d_J$ treating $\alpha_{E0}p_L d_{E0}$ as noise, then, $d_B+d_J$ is cancelled from equation (Eq. 3) in order to decode $d_{E0}$ without interference. Alternatively, when the difference between $\alpha_{E0}p_H$ and $\alpha_{E0}p_L$ is small, a joint ML decoding of $d_{E0}$ and $d_B+d_J$ can be performed by (3). Note that for implementing the SIC processing described above it is required to use discrete constellations for signaling information, therefore, in the proposed scheme, pre-defined discrete constellations are considered for $d_{E0}$, $d_B$ and $d_J$. In terms of secrecy, the alignment of $d_B$ with $d_J$ in the same subspace forces (3) to tap the information related to $d_B$ only from the observation of $d_B+d_J$. Moreover, the approximation $\alpha_B p_L \approx 0$ is valid in the high signal-to-noise ratio (SNR) regime when $p_L \ll p_H$. Therefore, the interference generated by $d_{E0}$ at node B (4) can be neglected under such circumstance. Under this consideration, the signal observed by (4) can be reformulated as $$\hat{y}_B(k) = \alpha_B p_H [h_{BA}(k)h_{E0A}^{-1}(k)d_B(k) + h_{BJ}(k)h_{E0J}^{-1}(k)d_J(k)] + n_B \quad \text{(Eq. 6)}$$

which means that by applying a maximum likelihood (ML) decoder, $d_B$ can be fully recovered in the high SNR regime when the equivalent channels $h_{BA}h_{E0A}^{-1}$, and $h_{BJ}h_{E0J}^{-1}$ are known at node (4). When the difference between $p_H$ and $p_L$ is small, $d_B$ can be recovered directly from (Eq. 4) performing a joint decoding of $d_{E0}$, $d_B$ and $d_J$ using an ML equalizer.

Figure 2:
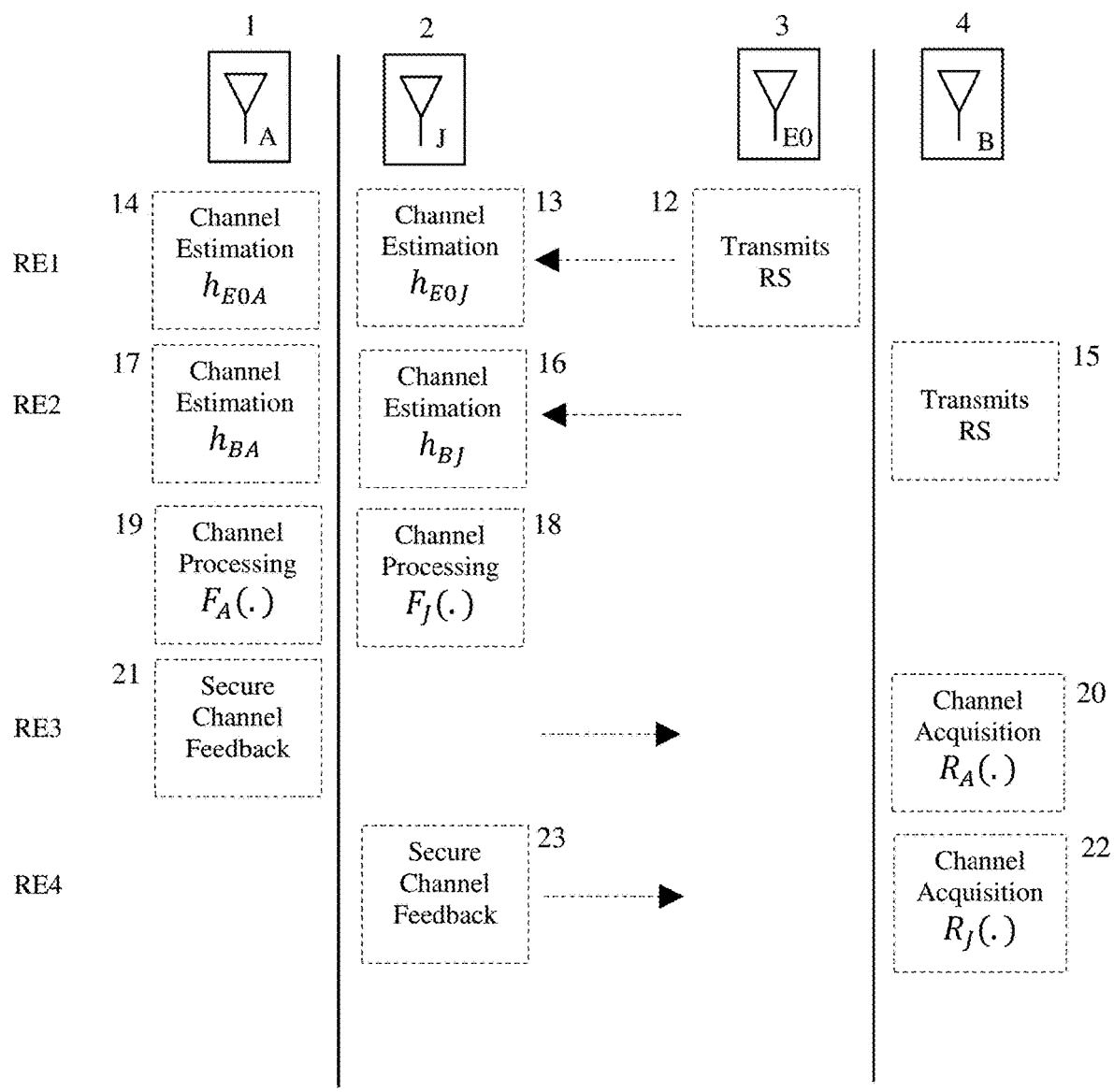
FIG. 2 represents a high-level block diagram of the channel training method proposed in the present disclosure for scenario 1. The diagram shows that terminal (3) transmits in resource element 1 (RE1) a RS that is used by (1) to estimate the channel $h_{E0A}(k)$ (6), and by (2) to estimate the channel $h_{E0J}(k)$ (9). Similarly, in resource element 2 (RE2) a RS is transmitted by (4) in order to allow (1) to estimate the channel $h_{BA}(k)$ (7), and (2) to estimate the channel $h_{BJ}(k)$ (10). Then, using as inputs the phases and magnitudes of the complex channels $h_{E0A}(k)$ (6) and $h_{BA}(k)$ (7), a channel processing block (19) defined by the function $F_A(.)$ is implemented at terminal (1). Similarly, using as inputs the phases and magnitudes of the complex channels $h_{E0J}(k)$ (9) and $h_{BJ}(k)$ (10), a channel processing block (18) defined by the function $F_J(.)$ is also implemented at terminal (2). Then, the output of $F_J(.)$ is transmitted from (2) to (4) in the resource element 4 (RE4), being the output of $F_A(.)$ transmitted from (1) to (4) in resource element 3 (RE3). Finally, in order to get the intended channel information, terminal (4) processes the signals received in RE3 and RE4 with the processing blocks (22) and (20), which are implemented by the functions $R_J(.)$ and $R_A(.)$, respectively.
Figure 3:
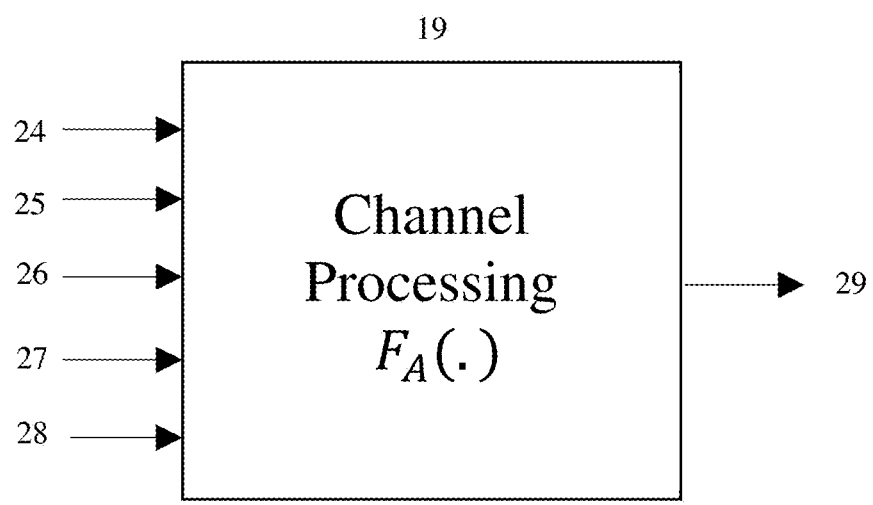
FIG. 3 represents the channel processing block (19) implemented by the proposed training method at terminal (1) for application scenario 1. The channel processing block (19) receives five inputs (24-28), processes those inputs according to the function $F_A(.)$, and outputs a complex signal (29) defined in equation (Eq. 7). Input (24) corresponds to the channel magnitude $|h_{E0A}(k)|$ between (3) and (1); input (25) corresponds to the signal $p_H|h_{BA}(k)|$, where $|h_{BA}(k)|$ defines the channel magnitude between (4) and (1), being $p_H$ a power allocation coefficient; input (26) corresponds to the phase $\theta_{E0A}(k)$ of the channel $h_{E0A}(k)$ (6) between (3) and (1); input (27) corresponds to the phase $\theta_{BA}(k)$ of the channel $h_{BA}(k)$ (7) between (4) and (1); and input (28) corresponds to an integer random variable defined as r(k), which for application scenario 1 is defined as 0.
Figure 4:
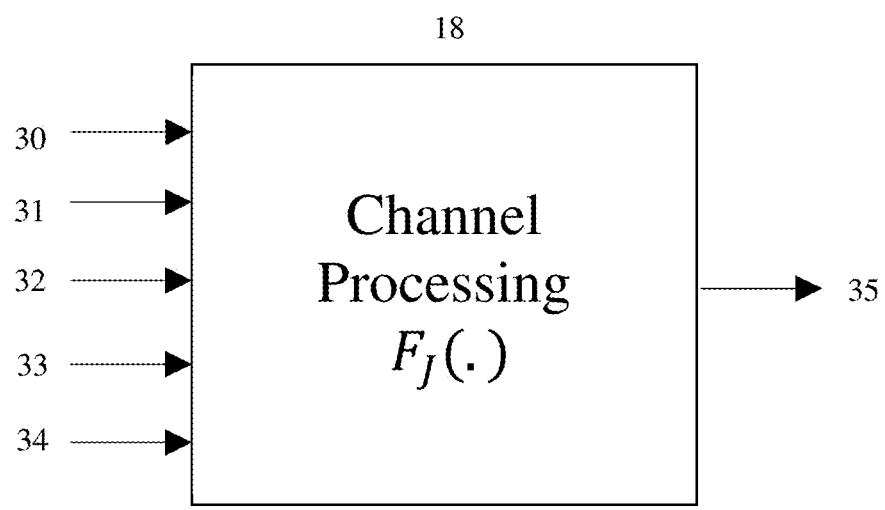
FIG. 4 represents the channel processing block (18) implemented by the proposed training method at terminal (2) for application scenario 1. The channel processing block (18) receives five inputs (30-34), processes those inputs according to the function $F_J(.)$ and outputs a complex signal (35) defined in equation (Eq. 8). Input (30) corresponds to the channel magnitude $|h_{E0J}(k)|$ between (3) and (2); input (31) corresponds to the signal $p_H|h_{BJ}(k)|$, where $|h_{BJ}(k)|$ defines the channel magnitude between (4) and (2), being $p_H$ a power allocation coefficient; input (32) corresponds to the phase $\theta_{E0J}(k)$ of the channel $h_{E0J}(k)$ (9) between (3) and (2); input (33) corresponds to the phase $\theta_{BJ}(k)$ of the channel $h_{BJ}(k)$ (10) between (4) and (2); and input (34) corresponds to an integer random variable defined as r(k), which for application scenario 1 is defined as 0.
Figure 5:
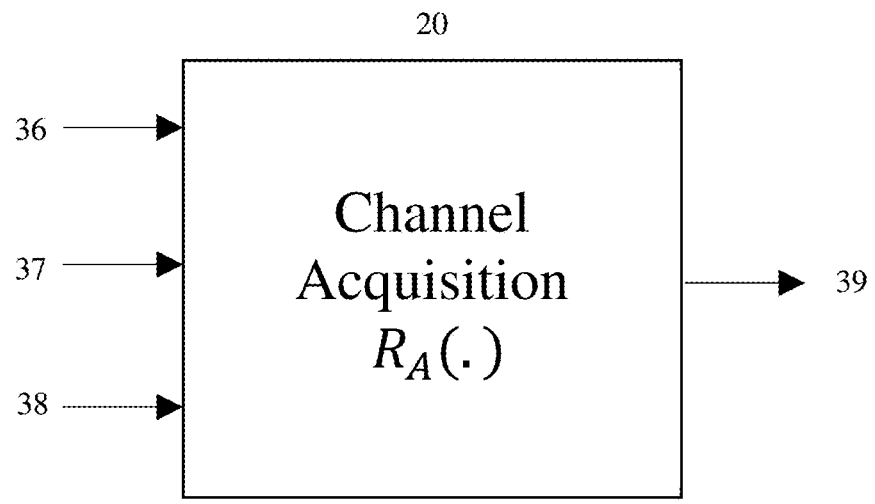
FIG. 5 represents the channel acquisition block (20) implemented by the proposed training method at terminal (4) for application scenario 1. The channel acquisition block (20) receives three inputs (36-38), processes those inputs according to the function $R_A(.)$ in equation (Eq. 11), and outputs a complex signal (39) defined in equation (Eq. 11). Input (36) corresponds to the magnitude $|y_{B,F(A)}(k)|$ of equation (Eq. 9) transmitted by (1) and received by (4) in RE3; input (37) corresponds to the phase $\theta_{B,F(A)}(k)$ of equation (Eq. 9) transmitted by (1) and received by (4) in RE3; and input (38) is a constant defined by $\alpha_B p_H$.
Figure 6:
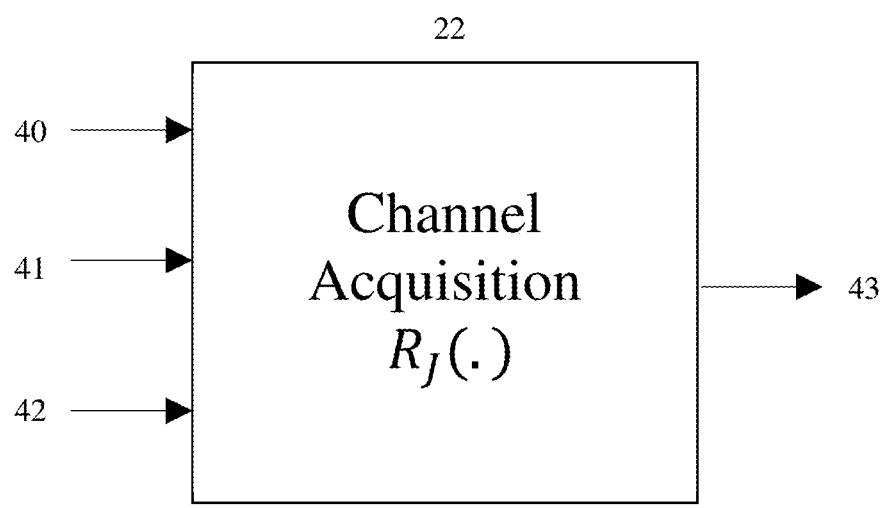
FIG. 6 represents the channel acquisition block (22) implemented by the proposed training method at terminal (4) for application scenario 1. The channel acquisition block (22) receives three inputs (40-42), processes those inputs according to the function $R_J(.)$ in equation (Eq. 12), and outputs a complex signal (43) defined in equation (Eq. 12). Input (40) corresponds to the magnitude $|y_{B,F(J)}(k)|$ of equation (Eq. 10) transmitted by (2) and received by (4) in RE4; input (41) corresponds to the phase $\theta_{B,F(J)}(k)$ of equation (Eq. 10) transmitted by (2) and received by (4) in RE4; and input (42) is a constant defined by $\alpha_B p_H$.

In an embodiment, in the training phase, the design of the channel training method (FIG. 2) associated to the present disclosure is done taking into account three main goals that should be mutually achieved, which are: to provide information regarding $h_{E0A}$ (6) and $h_{E0J}$ (9) to nodes (1) and (2), respectively; to ensure that node (4) has access to the equivalent channels $h_{BA}h_{E0A}^{-1}$, $h_{BA}h_{E0J}^{-1}$; and to limit the amount of channel knowledge that the outside attacker (5) can obtain from this training process. While in the case of (3) the secrecy regarding $d_B$ is entirely ensured by the jamming component, in the case of (5) this protection will depend also on the design of the training phase. The secure training solution developed in the present disclosure is divided into four resource elements (RE) located within a coherence block of the channel, being the first two resource elements RE1,RE2 applied for channel estimation (14),(17), and the last two RE3,RE4 for channel state information feedback (21),(23). The purpose of the channel estimation process implemented in the first two resource elements RE1,RE2 of the training method is to provide the equivalent channels $h_{BA}h_{E0A}^{-1}$ and $h_{BA}h_{E0J}^{-1}$ to node (1) and (2), respectively. To achieve that, in resource element 1 (RE1) terminal (3) sends a reference signal (12) that provides $h_{E0A}$ (6) to (1) and $h_{E0J}$ (9) to node (2), while in resource element 2 (RE2) the RS (15) is sent by (4) giving $h_{BA}$ (7) to (1) and $h_{BJ}$ (10) to (2). In order to allow node (4) to extract $d_B$ from equation (Eq. 4) or (Eq. 6) using a joint ML decoding, the equivalent channels $h_{BA}h_{E0A}^{-1}$ and $h_{BA}h_{E0J}^{-1}$ acquired in the channel estimation phase (RE1,RE2) are fed back (21),(23) in secrecy to node (4) in the last two resource elements RE3,RE4 of the training method. In resource element 3 (RE3) node (1) feedbacks to (4) information regarding $h_{BA}h_{E0A}^{-1}$ transmitting signal $x_{F(A)}$ in equation (Eq. 7), while in resource element 4 (RE4) node (2) exchanges $h_{BA}h_{E0J}^{-1}$ with (4) sending signal $x_{F(J)}$ in equation (Eq. 8), $$x_{F(A)}(k) = F_A[p_H h_{BA}(k), h_{E0A}(k), r(k) = 0] \qquad \text{(Eq. 7)}$$
$$= p_H |h_{BA}(k)||h_{E0A}(k)|^{-2} e^{j[\theta_{E0A}(k) - 2\theta_{BA}(k) - r(k)\frac{2\pi}{M}]}$$
$$= p_H |h_{BA}(k)||h_{E0A}(k)|^{-2} e^{j[\theta_{E0A}(k) - 2\theta_{BA}(k)]}$$

$$x_{F(J)}(k) = F_J[p_H h_{BJ}(k), h_{E0J}(k), r(k) = 0] \qquad \text{(Eq. 8)}$$
$$= p_H |h_{BJ}(k)||h_{E0J}(k)|^{-2} e^{j[\theta_{E0J}(k) - 2\theta_{BJ}(k) - r(k)\frac{2\pi}{M}]}$$
$$= p_H |h_{BJ}(k)||h_{E0J}(k)|^{-2} e^{j[\theta_{E0J}(k) - 2\theta_{BJ}(k)]}$$

where $|h_{RT}|$ and $\theta_{RT}$ defines the magnitude and phase of the channel $h_{RT}$ for $R \in \{E0, B, E1\}$ and $T \in \{A, J\}$. As can be seen from equations (Eq. 7) and (Eq. 8), in order to configure the proposed disclosure for this application scenario, the parameter $r(k)$ is set to zero. Taking into account equations (Eq. 7) and (Eq. 8), the signal received by (4) in RE3 is formulated in equation (Eq. 9), being the one received in RE4 defined by equation (Eq. 10).

$$y_{B,F(A)}(k) = \alpha_B x_{F(A)}(k) h_{BA}(k) \qquad \text{(Eq. 9)}$$
$$= \alpha_B p_H [|h_{BA}(k)||h_{E0A}(k)|^{-1}]^{-2} e^{j[\theta_{E0A}(k) - \theta_{BA}(k)]}$$

$$y_{B,F(J)}(k) = \alpha_B x_{F(J)}(k) h_{BJ}(k) \qquad \text{(Eq. 10)}$$
$$= \alpha_B p_H [|h_{BJ}(k)||h_{E0J}(k)|^{-1}]^{2} e^{j[\theta_{E0J}(k) - \theta_{BJ}(k)]}$$

In an embodiment, considering that $\alpha_B p_H$ is a large scale coefficient known at (4), the extraction of $h_{BA}h_{E0A}^{-1}$ and $h_{BA}h_{E0J}^{-1}$ at node (4) is done through the implementation of the processing operations defined in equations (Eq. 11) and (Eq. 12), being $\theta_{B,F(A)}(k)$ and $\theta_{B,F(J)}(k)$ defined as the phases of equations (Eq. 9) and (Eq. 10), respectively.

$$R_A[y_{B,F(A)}(k), \alpha_B p_H] = \left(\frac{|y_{B,F(A)}(k)|}{\alpha_B p_H}\right)^{1/2} e^{-j\theta_{B,F(A)}(k)} \qquad \text{(Eq. 11)}$$
$$= h_{BA}(k) h_{E0A}(k)^{-1}$$

$$R_J[y_{B,F(J)}(k), \alpha_B p_H] = \left(\frac{|y_{B,F(J)}(k)|}{\alpha_B p_H}\right)^{1/2} e^{j\theta_{B,F(J)}(k)} \qquad \text{(Eq. 12)}$$
$$= h_{BJ}(k) h_{E0J}(k)^{-1}$$

In an embodiment, although the overhead of four resource elements, the training solution proposed in the present disclosure allows to protect the channels that (5) needs to know for extracting the information $d_B$ through the observation of equation (Eq. 5). In the mathematical formulations presented above no channel estimation errors are considered and a noiseless channel is assumed for the feedback phase, i.e. the channel training process is ideal. Furthermore, it is also considered that the length of the channel coherent interval is wide enough to perform training and transmission in the considered resource elements RE1-RE4.

In an embodiment, to quantify the secrecy level provided by the present disclosure according to physical layer security principles, the mutual information will be used as the assessment metric. Although the present embodiment is focused in securing the system against the outside attacker (5), the developed training method was designed to be integrated in a jamming scenario, therefore, the secrecy level provided by the jammer (2) against the inside attacker (3) is also evaluated in the secrecy analysis presented next.

In an embodiment, in the case of the inside attacker (3), the alignment of $d_B$ with $d_J$ in (Eq. 3) ensures that (3) is not capable to obtain more information regarding $d_B$ than the one he can extract through the observation of $d_B + d_J$. In order to protect $d_B$, the integer addition $d_B + d_J$ has to generate equivocation in (3), being this equivocation dependent on the structure of the discrete constellations selected for $d_B$ and $d_J$. It is known that the use of complex square QAM signals is efficient in generating this equivocation, therefore, this type of constellation is used for $d_B$, $d_{E0}$ and $d_J$. Considering independent and uniformly distributed square QAM signals of order $M = L^2$ for $d_B$ and $d_J$, an upper bound on the normalized mutual information $I(d_B; d_B + d_J)$ is defined in equation (Eq. 13).

$$\frac{I(d_B; d_B + d_J)}{\log_2(M)} \leq \frac{\overline{I(d_B; d_B + d_J)}}{\log_2(M)} = \log_2\left(2 - \frac{1}{L}\right) \times \frac{1}{\log_2(L)} \qquad \text{(Eq. 13)}$$

$$\lim_{L \to \infty}\left[\log_2\left(2 - \frac{1}{L}\right) \times \frac{1}{\log_2(L)}\right] = 0 \qquad \text{(Eq. 14)}$$

In an embodiment, the result in equation (Eq. 14) shows that asymptotically when $L \to \infty$ the amount of information related to $d_B$ obtained by the inside attacker (3) is zero, which means that full secrecy is reached when the order M of $d_B$ and $d_J$ grows to infinity.

In an embodiment, in the case of the outside attacker (5), the secrecy level provided by the proposed invention depends not only on the signal $y_{E1}$ defined in equation (Eq. 5) observed during the main communication phase, but also depends on the signals received during the training phase. Although $d_B$ is not present in any of the signals defined by equations (Eq. 7) and (Eq. 8), some information about the communication channels, which are required at (5) to extract $d_B$ from equation (Eq. 5) can be acquired during this phase. Therefore, in the following secrecy analysis both phases are considered to evaluate the level of protection against node (5). Assuming a noiseless scenario, the signals observed during the training phase at node (5) are formulated in equations (Eq. 15) and (Eq. 16).

$$y_{E1,F(A)}(k) = \alpha_{E1} x_{F(A)}(k) h_{E1A}(k) \qquad \text{(Eq. 15)}$$
$$= \alpha_{E1} p_H |h_{BA}(k)||h_{E1A}(k)||h_{E0A}(k)|^{-2}$$
$$e^{j[\theta_{E1A}(k) + \theta_{E0A}(k) - 2\theta_{BA}(k)]}$$

-continued $$y_{E1,F(J)}(k) = \alpha_{E1} x_{F(J)}(k) h_{E1J}(k) \quad \text{(Eq. 16)}$$
$$= \alpha_{E1} p_H |h_{BJ}(k)| |h_{E1J}(k)| |h_{E0J}(k)|^{-2}$$
$$e^{j[\theta_{E1J}(k) + \theta_{E0J}(k) - 2\theta_{BJ}(k)]}$$

In an embodiment, in equation (Eq. 15) $y_{E1,F(A)}$ defines the signal observed at (5) during the feedback of equation (Eq. 7) from (1) to (4) in RE3, being equation (Eq. 16) the signal acquired during the transmission of equation (Eq. 8) from (2) to (4) in RE4. In the case of the main communication phase, the signal obtained by (5) was formulated in equation (Eq. 5). Since the target of (5) is to tap information regarding $d_B$, the interference generated by $d_{E0}$ and $d_J$ in equation (Eq. 5) reduces always the capacity of (5) to get the intended information, which means that an upper bound on the mutual information $I(d_B; y_{E1})$ is obtained when these two interference components are eliminated. In order to simplify the secrecy evaluation related to the outside attacker (5), in the following analysis $d_{E0}$ and $d_J$ will be defined as zero. Therefore, under the non-interference scenario, the signal observed at (5) can be reformulated as defined in equation (Eq. 17).

$$\hat{y}_{E1}(k) = \alpha_{E1} p_H h_{E1A}(k) h_{E0A}(k)^{-1} d_B(k) \quad \text{(Eq. 17)}$$
$$= \alpha_{E1} p_H |h_{E1A}(k)| |h_{E0A}(k)|^{-1} |d_B(k)|$$
$$e^{j[\theta_{E1A}(k) - \theta_{E0A}(k) + \theta_B(k)]}$$

In an embodiment, because the interference caused by the jamming signal $d_J$ was removed in equation (Eq. 17), the observation of the signal in equation (Eq. 16) at (5) does not add any information useful to extract $d_B$, which means that an upper bound on the mutual information at (5) can be calculated using only equations (Eq. 17) and (Eq. 15). Considering $|h_{E0A}|$ known at (5), and for a constant $\alpha = \alpha_{E1} p_H$, a theoretical upper bound on the amount of information obtained by the outside attacker (5) is formulated in equation (Eq. 18).

$$I(d_B; \hat{y}_{E1}, y_{E1,F(A)}) \leq I(|d_B|; \alpha|d_B||h_{E1A}|, \alpha|h_{E1A}||h_{BA}|) \leq \quad \text{(Eq. 18)}$$
$$\overline{I(|d_B|; \alpha|d_B||h_{E1A}|, \alpha|h_{E1A}||h_{BA}|)} =$$
$$\frac{1}{2}\log_2(2\pi e \sigma_A^2) + \frac{1}{2}\log_2(2\pi e \sigma_B^2) -$$
$$[E(\log_2|d_B|) + h(|h_{E1A}|) + E(\log_2|h_{E1A}|) + h(|h_{BA}|)]$$

In equation (Eq. 18) $\sigma_A^2$ defines the variance of the product $|d_B||h_{E1A}|$, $\sigma_B^2$ the variance of $|h_{E1A}||h_{BA}|$, being h(x) and E(x) the differential entropy and the expected value of the random variable x, respectively.

$$\lim_{M \to \infty} \frac{\overline{I(|d_B|; \alpha|d_B||h_{E1A}|, \alpha|h_{E1A}||h_{BA}|)}}{\log_2(M)} = 0. \quad \text{(Eq. 19)}$$

In an embodiment, as defined in (Eq. 19), the asymptotic behaviour of the theoretical upper bound formulated in equation (Eq. 18) makes the percentage of information acquired by (5) goes to zero when the cardinality M of $d_B$ increases. In an embodiment, although the application example associated to the embodiment presented in FIG. 1 only considers two single antenna transmitters (1-2) and two single antenna receivers (3-4), the proposed disclosure can be integrated in an up-scaled version of the system illustrated in FIG. 1, up-scaling not only the number of transmitters (1-2) and receivers (3-4), but also the number of antennas applied by these nodes (1-4).

Example 2 represents 1 single antenna legitimate transmitter (44); 2 single antenna legitimate receivers (45), (46); and 1 single antenna passive eavesdropper receiver (47).

Figure 7:
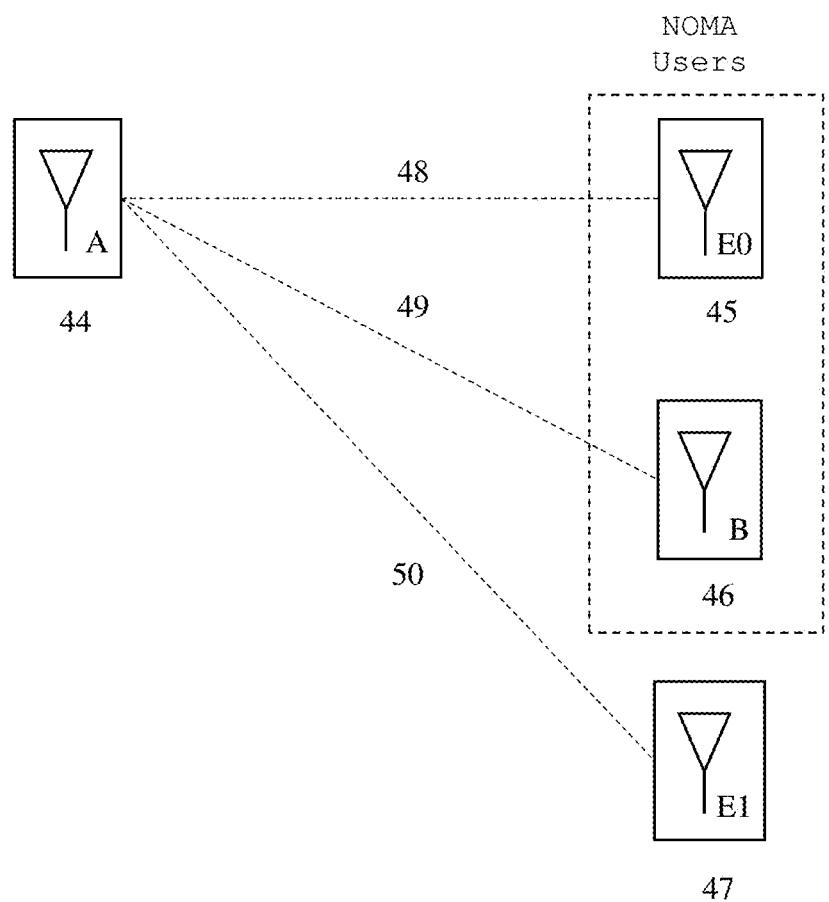
FIG. 7 is a schematic of the wireless communication scenario 2 where the present disclosure is implemented. In the respective schematic, four single antenna terminals are represented, being each one defined as: (44) is a legitimate transmitter; (46) is the attacked legitimate receiver that is also the NOMA user with the weakest channel; (45) is the eavesdropper that attacks (46) from the inside of the network, being also the NOMA user with the strongest channel; (47) is a second eavesdropper that attacks (46) from the outside of the network. Regarding the channel coefficients, (48) is the small-scale channel fading coefficient $h_{E0A}(k)$ between (45) and (44), (49) is the small-scale channel fading coefficient $h_{BA}(k)$ between (46) and (44), (50) is the small-scale channel fading coefficient $h_{E1A}(k)$ between (47) and (44).

In an embodiment, FIG. 7 illustrates an example of an embodiment of the proposed disclosure in a wireless communication system for application Scenario 2. In the considered communication system, node (44) pretends to transmit in secrecy $d_B$ to node (46) and $d_{E0}$ to (45), using for that a power domain non-orthogonal multiple access system in which (45) is the strongest user and node (46) represents the weakest user. The embodiment illustrated in FIG. 7 considers that the distance between node (44) and (45) is lower than the distance between (44) and (46), therefore, as it is usually defined in the state of art techniques, (45) is the strongest user with node (46) being the weakest user. In power domain non-orthogonal multiple access systems, the strongest user (45) can only reach their intended information after decoding the interference generated by the weakest user (46), being this interference posteriorly cancelled from the overall received signal using a successive interference cancellation (SIC) equalizer. Because (45) will decode first the interference created by dg before accessing the information $d_{E0}$ sent to him, this node (45) will be recognized by the network as a legitimate user that also has the capacity to eavesdrop $d_B$ attacking the network from inside. Additionally, in order to model the occurrence of an outside attack, the embodiment in FIG. 7 also assumes that a passive eavesdropper (47) not registered in the network, and not co-located with (46), tries to tap in an undetectable way the information $d_B$ sent to node (46).

In an embodiment, in the following, the random variables defined by $h_{RT}$ with $R \in \{E0, B, E1\}$ and $T \in \{A\}$ represent small scale channel fading effects which are modelled by zero mean independent complex Gaussian distributions with variance $\sigma_h^2$. The path-loss attenuation between the transmitting nodes T and each one of the receiving nodes (45-47) in R is represented by the coefficients $\alpha_{E0}$, $\alpha_B$ and $\alpha_{E1}$, where it is assumed that $\alpha_B < \alpha_{E0}$. Ideal RF up- and down-conversion is assumed, being the described baseband processing applied to an independent realization of the system denoted by k.

In an embodiment, the non-orthogonal multiple access communication process associated to the embodiment illustrated in FIG. 7 comprises two phases; a preliminary channel training phase (Phase I), and the main communication phase (Phase II). Although the main communication phase happens posteriorly to the training phase, the design of the secure training method associated to the present disclosure depends on the signal structure of the communication phase, hence, we will start by describing the communication phase.

In an embodiment, in the communication phase, the information signals $d_B$ and $d_{E0}$ are sent to the intended receivers, (46) and (45) respectively, using for both streams a discrete PSK constellation of order M featuring a structure with a constant phase shift $\Delta\phi = 2\pi/M$ between any consecutive pair of points in the constellation set. Assuming that $p_L$ and $p_H$ are power allocation coefficients computed according to the geographic distribution of (45) and (46), the signal transmitted by node (44) is formulated in equation (Eq. 20).

$$x_A(k) = h_{E0A}^{-1}(k)[p_L d_{E0}(k) + p_H d_B(k)e^{j\theta_K(k)}] \quad (Eq.\ 20)$$

$$= h_{E0A}^{-1}(k)\left[p_L d_{E0}(k) + p_H d_B(k)e^{j[r(k)\frac{2\pi}{M}]}\right]$$

$$= h_{E0A}^{-1}(k)\left[p_L e^{j\theta_{d_{E0}}(k)} + p_H e^{j[\theta_{d_B}(k)+r(k)\frac{2\pi}{M}]}\right]$$

$$= h_{E0A}^{-1}(k)[p_L d_{E0}(k) + p_H d_{B,K}(k)]$$

In an embodiment, as defined in equation (Eq. 20), the information associated to $d_B(k)$ is coded in the phase $\theta_{d_B}(k)$, while the information of $d_{E0}(k)$ is carried in the phase $\theta_{d_{E0}}(k)$, being $\theta_{d_B}(k)$ and $\theta_{d_{E0}}(k)$ independent uniform random variables selected from the phases of a PSK constellation of order M. Additionally, a random variable $\theta_K(k)$ is formulated as $\theta_K(k)=r(k)[2\pi/M]$, being r defined as an independent random variable distributed uniformly in the integer set within the interval $r \in [1, M]$. Then, as shown in equation (Eq. 20), $d_B(k)$ is processed with $\theta_K(k)$ resulting in the signal $$d_{B,K}(k) = e^{j[\theta_{d_B}(k)+r(k)\frac{2\pi}{M}]}.$$

In an embodiment, because the strongest user (45) is located closer to (44), the amount of power $p_L$ allocated to (45) should be lower than the power $p_H$ allocated to the weakest user (46). Taking into account equation (Eq. 20), the signal observed by node (45) is given by equation (Eq. 21), with equations (Eq. 22) and (Eq. 23) defining the signals observed by (46) and (47), respectively.

$$y_{E0}(k) = \alpha_{E0} h_{E0A}(k) x_A(k) + n_{E0} \quad (Eq.\ 21)$$

$$= \alpha_{E0}[p_L d_{E0}(k) + p_H d_{B,K}(k)] + n_{E0}$$

$$= \alpha_{E0}\left[p_L e^{j\theta_{d_{E0}}(k)} + p_H e^{j[\theta_{d_B}(k)+r(k)\frac{2\pi}{M}]}\right] + n_{E0}$$

$$y_B(k) = \alpha_B h_{BA}(k) x_A(k) + n_B \quad (Eq.\ 22)$$

$$= \alpha_B h_{BA}(k) h_{E0A}^{-1}(k)[p_L d_{E0}(k) + p_H d_{B,K}(k)] + n_B$$

$$= \alpha_B h_{BA}(k) h_{E0A}^{-1}(k)\begin{bmatrix} p_L e^{j\theta_{d_{E0}}(k)} + \\ p_H e^{j[\theta_{d_B}(k)+r(k)\frac{2\pi}{M}]} \end{bmatrix} + n_B$$

$$y_{E1}(k) = \alpha_{E1} h_{E1A}(k) x_A(k) + n_{E1} \quad (Eq.\ 23)$$

$$= \alpha_{E1} h_{E1A}(k) h_{E0A}^{-1}(k)[p_L d_{E0}(k) + p_H d_{B,K}(k)] + n_{E1}$$

$$= \alpha_{E1} h_{E1A}(k) h_{E0A}^{-1}(k)\begin{bmatrix} p_L e^{j\theta_{d_{E0}}(k)} + \\ p_H e^{j[\theta_{d_B}(k)+r(k)\frac{2\pi}{M}]} \end{bmatrix} + n_{E1}$$

In an embodiment, in the case of (45), when $\alpha_{E0} p_H$ is much larger than $\alpha_{E0} p_L$, a SIC equalizer can be applied to equation (Eq. 21) in order to get $d_{E0}$. As it is typical of power-domain NOMA systems, first (45) decodes $d_{B,K}(k)$ treating $\alpha_{E0} p_L d_{E0}(k)$ as noise, then, $d_{B,K}(k)$ is cancelled from equation (Eq. 21) in order to decode $d_{E0}(k)$ without interference. Alternatively, a joint ML decoding of $d_{E0}(k)$ and $d_{B,K}(k)$ can also be applied to (Eq. 21). In terms of secrecy, $d_B(k)$ is internally protected against (45) if the effect of $\theta_K(k)$ can be entirely resolved in (46) ensuring at the same time that $\theta_K(k)$ is not accessible at (45).

In an embodiment, the approximation $\alpha_B p_L \approx 0$ is valid in the high SNR regime when $p_L \ll p_H$, therefore, the interference generated by $d_{E0}(k)$ at node B can be neglected for simplification purposes. Under this consideration, the signal observed by (46) can be reformulated as $$\hat{y}_B(k) = \alpha_B h_{BA}(k) h_{E0A}^{-1}(k) p_H d_{B,K}(k) + n_B \quad (Eq.\ 24)$$

$$= \alpha_B h_{BA}(k) h_{E0A}^{-1}(k) p_H e^{j[\theta_{d_B}(k)+r(k)\frac{2\pi}{M}]} + n_B$$

$$= \alpha_B p_H h_{BA}(k) h_{E0A}^{-1}(k) e^{j[r(k)\frac{2\pi}{M}]} d_B(k) + n_B$$

which means that by applying a maximum likelihood (ML) decoder, $d_B(k)$ can be fully recovered in the high signal to noise ratio (SNR) regime when the equivalent channel $$h_{BA}(k) h_{E0A}^{-1}(k) e^{j[r(k)\frac{2\pi}{M}]}$$

is known at node (46). Alternatively, using again $$h_{BA}(k) h_{E0A}^{-1}(k) e^{j[r(k)\frac{2\pi}{M}]},$$

a joint ML decoding of $$d_{E0}(k) e^{-j[r(k)\frac{2\pi}{M}]}$$

and $d_B(k)$ can be applied directly to expression (Eq. 22) in order to get $d_B(k)$.

In an embodiment, the design of the channel training method (FIG. 7) associated to the present disclosure is done taking into account three main goals that should be mutually achieved, which are: to provide information regarding $h_{E0A}$ (48) to node (44); to ensure that node (46) has access to the equivalent channel $$h_{BA}(k) h_{E0A}^{-1}(k) e^{j[r(k)\frac{2\pi}{M}]}$$

in a way that the random phase $\theta_K(k)=r(k)[2\pi/M]$ cannot be resolved at (45); and to limit the amount of channel and encoding knowledge that the outside attacker (47) can obtain from this training process.

Figure 8:
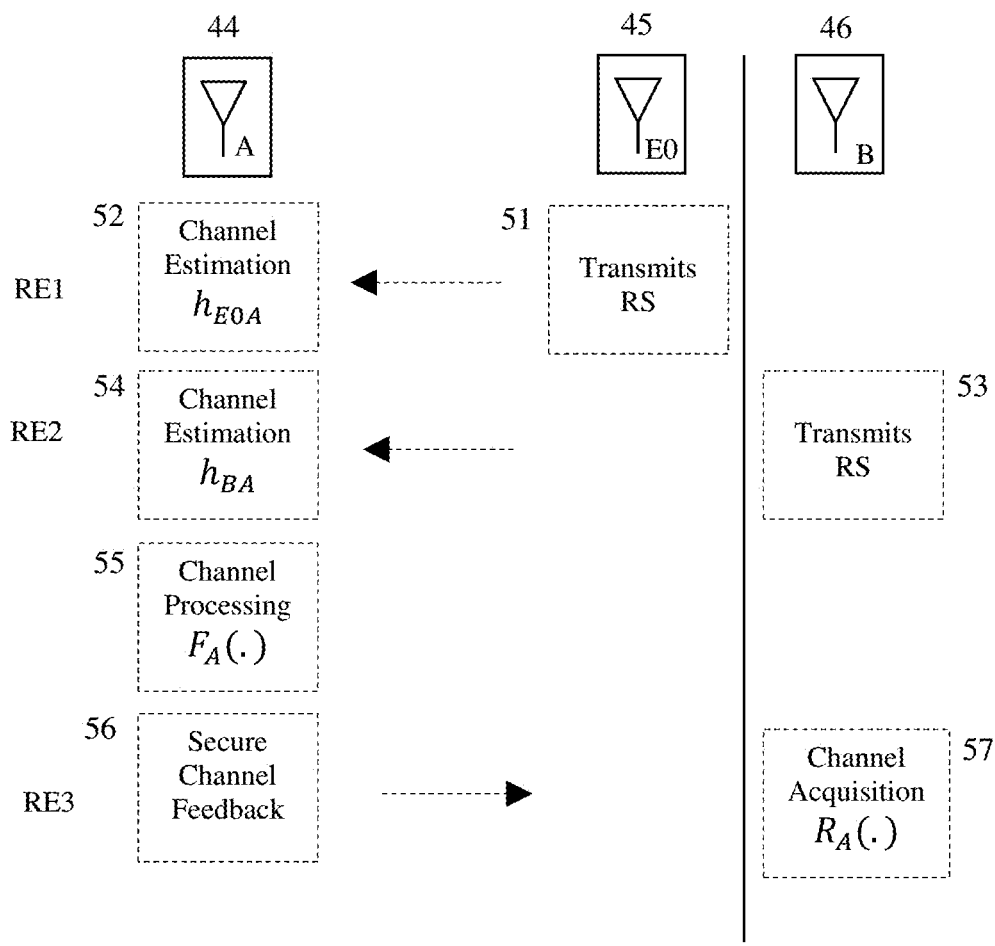
FIG. 8 represents a high-level block diagram of the channel training method proposed in the present disclosure for application scenario 2. The diagram shows that terminal (45) transmits in resource element 1 (RE1) a RS that is used by (44) to estimate the channel $h_{E0A}(k)$ (48). Similarly, in resource element 2 (RE2) a RS is transmitted by (46) in order to allow (44) to estimate the channel $h_{BA}(k)$ (49). Then, using as inputs the phases and magnitudes of the complex channels $h_{E0A}(k)$ (48), $h_{BA}(k)$ (49), and an integer random variable defined as r(k), a channel processing block (55) defined by the function $F_A(.)$ is implemented at terminal (44). Then, the output of $F_A(.)$ is transmitted from (44) to (46) in resource element 3 (RE3). Finally, in order to get the intended system information, terminal (46) processes the signal received in RE3 with the processing block (57), which is implemented by the function $R_A(.)$.
Figure 9:
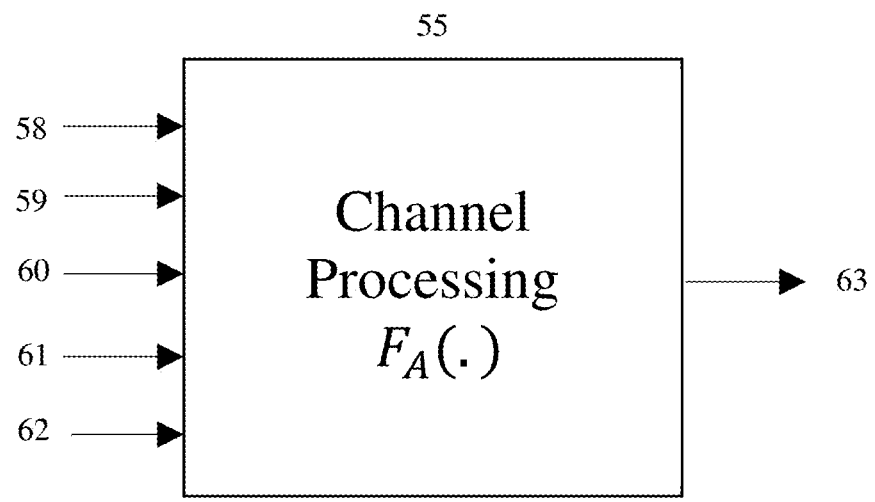
FIG. 9 represents the channel processing block (55) implemented by the proposed training method at terminal (44) for application scenario 2. The channel processing block (44) receives five inputs (58-62), processes those inputs according to the function $F_A(.)$, and outputs a complex signal (63) defined in equation (Eq. 25). Input (58) corresponds to the channel magnitude $|h_{E0A}(k)|$ between (45) and (44); input (59) corresponds the signal $p_H|h_{BA}(k)|$, where $|h_{BA}(k)|$ defines the channel magnitude between (46) and (44), being $p_H$ a power allocation coefficient; input (60) corresponds to the phase $\theta_{E0A}(k)$ of the channel $h_{E0A}(k)$ (48) between (45) and (44); input (61) corresponds to the phase $\theta_{BA}(k)$ of the channel $h_{BA}(k)$ (49) between (46) and (44); and input (62) corresponds to an integer random variable defined as r(k) distributed uniformly in the integer set within [1, M], being M the order of the constellations applied for the information streams.
Figure 10:
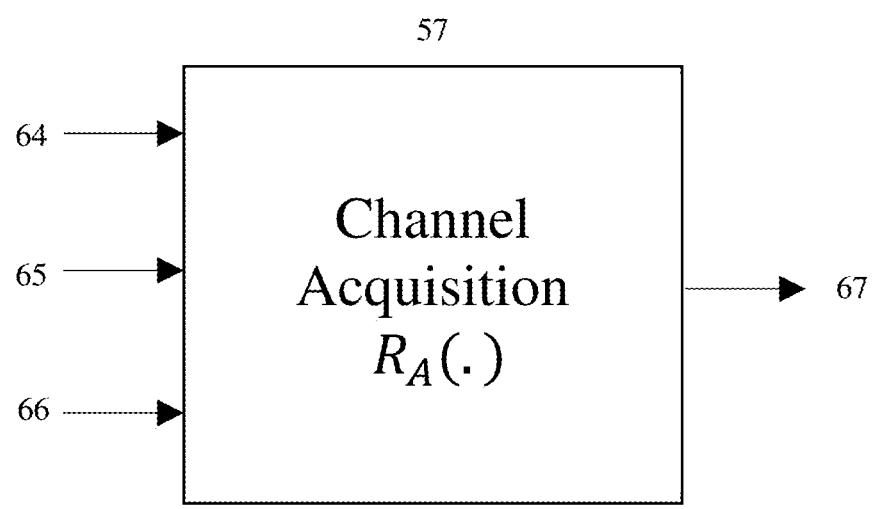
FIG. 10 represents the channel acquisition block (57) implemented by the proposed training method at terminal (46). The channel acquisition block (57) receives three inputs (64-66), processes those inputs according to the function $R_A$ (.) in equation (Eq. 27), and outputs a complex signal (67) defined in equation (Eq. 27). Input (64) corresponds to the magnitude $|y_{B,F(A)}(k)|$ of equation (Eq. 26) transmitted by (44) and received by (46) in RE3; input (65) corresponds to the phase $\theta_{B,F(A)}(k)$ of equation (Eq. 26) transmitted by (44) and received by (46) in RE3; and input (66) is a constant defined by $\alpha_B p_H$.

In an embodiment, the secure training solution (FIG. 8) developed in the present disclosure applied to application scenario 2 is divided into three resource elements (RE) located within a coherence block of the channel, being the first two resource elements RE1,RE2 applied for channel estimation (52),(54), and the last one RE3 for channel and encoding information feedback (56). The main objective of the channel estimation process implemented in the first two resource elements RE1, RE2 of the training method is to provide the equivalent channels $h_{BA}(k)$ and $h_{E0A}(k)$ to node (44). To achieve that, in RE1 terminal (45) sends a reference signal (51) that provides $h_{E0A}(k)$ (48) to (44), while in RE2 the RS (53) is sent by (46) giving $h_{BA}(k)$ (49) to (44). In order to allow node (46) to decode $d_B(k)$ from equation (Eq. 22) or (Eq. 24) using a ML equalizer, the equivalent channel $$h_{BA}(k) h_{E0A}^{-1}(k) e^{j[r(k)\frac{2\pi}{M}]}$$

is fed back (56) to node (46) in the last resource element RE3 of the training method. Therefore, in RE3 node (44) feedbacks to (46) information regarding $$h_{BA}(k)h_{E0A}^{-1}(k)e^{j\left[r(k)\frac{2\pi}{M}\right]}$$

transmitting signal $x_{F(A)}$ in equation (Eq. 25).

$$x_{F(A)}(k) = F_A[p_H h_{BA}(k), h_{E0A}(k), r(k)] \quad \text{(Eq. 25)}$$

$$= p_H |h_{BA}(k)||h_{E0A}(k)|^{-2} e^{j\left[\theta_{E0A}(k) - 2\theta_{BA}(k) - r(k)\frac{2\pi}{M}\right]}$$

where $|h_{RT}|$ and $\theta_{RT}$ defines the magnitude and phase of the channel $h_{RT}$ for $R \in \{E0, B, E1\}$ and $T \in \{A\}$. Taking into account equations (Eq. 25), the signal received by (46) in RE3 is formulated in equation (Eq. 26).

$$y_{B,F(A)}(k) = \alpha_B x_{F(A)}(k) h_{BA}(k) \quad \text{(Eq. 26)}$$

$$= \alpha_B p_H [|h_{BA}(k)||h_{E0A}(k)|^{-1}]^2 e^{j\left[\theta_{E0A}(k) - \theta_{BA}(k) - r(k)\frac{2\pi}{M}\right]}$$

In an embodiment, considering that $\alpha_B p_H$ is a large scale coefficient known at (46), the extraction of $$h_{BA}(k)h_{E0A}^{-1}(k)e^{j\left[r(k)\frac{2\pi}{M}\right]}$$

at node (46) is done through the implementation of the processing operations defined in equation (Eq. 27), being $\theta_{B,F(A)}(k)$ the phase of $y_{B,F(A)}(k)$.

$$R_A[y_{B,F(A)}(k), \alpha_B p_H] = \left(\frac{|y_{B,F(A)}(k)|}{\alpha_B p_H}\right)^{1/2} e^{-j\theta_{B,F(A)}(k)} \quad \text{(Eq. 27)}$$

$$= h_{BA}(k)h_{E0A}^{-1}(k)e^{j\left[r(k)\frac{2\pi}{M}\right]}$$

In an embodiment, although the overhead of three resource elements, the training solution proposed in this disclosure allows to protect the channels and the encoding information that (47) needs to know for extracting the information $d_B(k)$ through the observation of equation (Eq. 23). In the mathematical formulations presented above no channel estimation errors are considered and a noiseless channel is assumed for the feedback phase, i.e. the channel training process is ideal. Furthermore, it is also considered that the length of the channel coherent interval is wide enough to perform training and transmission in the considered resource elements RE1-RE3.

In an embodiment, in order to show that the secure training method proposed in the present disclosure ensures full secrecy of $d_B(k)$ against the inside (45) and outside (47) eavesdropping attack, the signals observed during the training and communication phase at nodes (45) and (47) should be jointly analysed using the mutual information I[.] as the assessment metric. Since the signals observed by (45) and (47) in the communication phase were already defined in equations (Eq. 21) and (Eq. 23), respectively, the next step required to quantify the achieved secrecy, is the formulation of the signals observed during the channel training phase at (45) and (47), which are defined in equations (Eq. 28) and (Eq. 30), respectively.

$$y_{E0,F(A)}(k) = \alpha_{E0} x_{F(A)}(k) h_{E0A}(k) \quad \text{(Eq. 28)}$$

$$= \alpha_{E0} p_H |h_{BA}(k)||h_{E0A}(k)|^{-1} e^{j\theta_{E0,F(A)}(k)}$$

$$\theta_{E0,F(A)}(k) = 2\theta_{E0A}(k) - 2\theta_{BA}(k) - r(k)\frac{2\pi}{M} \quad \text{(Eq. 29)}$$

$$y_{E1,F(A)}(k) = \alpha_{E1} x_{F(A)}(k) h_{E1A}(k) \quad \text{(Eq. 30)}$$

$$= \alpha_{E1} p_H |h_{E1A}(k)||h_{BA}(k)||h_{E0A}(k)|^{-2} e^{j\theta_{E1,F(A)}(k)}$$

$$\theta_{E1,F(A)}(k) = \theta_{E1A}(k) + \theta_{E0A}(k) - 2\theta_{BA}(k) - r(k)\frac{2\pi}{M} \quad \text{(Eq. 31)}$$

In an embodiment, taking into account the observed signals in equations (Eq. 21) and (Eq. 28), the amount of information that (45) can obtain about $d_B$ can be quantified as $$I[d_B; y_{E0}|y_{E0,F(A)}] = H(d_B) - H(d_B|y_{E0}, y_{E0,F(A)}) \quad \text{(Eq. 32)}$$

$$\leq H(d_B) - H(d_B|d_{B,K}, y_{E0,F(A)})$$

$$= H(\theta_{d_B}) - H\left(\theta_{d_B}\Big|\theta_{d_B} + \theta_K, \theta_{E0,F(A)}\right)$$

$$= H(\theta_{d_B}) - H\left(\theta_{d_B}\Big|\theta_{d_B} + r\frac{2\pi}{M}, \theta_{E0,F(A)}\right)$$

$$= 0$$

In an embodiment, because $\theta_{E0A}$ and $\theta_{BA}$ are continuous random variables not known at (45), and being $\theta_K = r(k)2\pi/M$ a uniform random variable that randomly rotates $d_B$ to other points of the original constellation set used to represent $d_B$, the equalities in equations (Eq. 33) and (Eq. 34) are verified, ensuring the result in (Eq. 32), i.e. the inside attacker (45) is not able to acquire any information about $d_B$.

$$p\left(\theta_{d_B}\Big|\theta_{d_B} + r\frac{2\pi}{M}, \theta_{E0,F(A)}\right) = p(\theta_{d_B}) \quad \text{(Eq. 33)}$$

$$H\left(\theta_{d_B}\Big|\theta_{d_B} + r\frac{2\pi}{M}, \theta_{E0,F(A)}\right) = H(\theta_{d_B}) \quad \text{(Eq. 34)}$$

In an embodiment, in the case of the outside attacker, considering the signals observed in (47), which are defined in equations (Eq. 23) and (Eq. 30), the amount of information that (47) is able to acquire about $d_B$ is computed as $$I[d_B; y_{E1}|y_{E1,F(A)}] = H(d_B) - H(d_B|y_{E1}, y_{E1,F(A)}) \quad \text{(Eq. 35)}$$

$$\leq H(\theta_{d_B}) - H(\theta_{d_B}|\theta_{E1,(B)}, \theta_{E1,F(A)})$$

$$= 0,$$

$$\theta_{E1(B)}(k) = \theta_{E1A}(k) - \theta_{E0A}(k) + \theta_{d_B}(k) - r(k)\frac{2\pi}{M} \quad \text{(Eq. 36)}$$

where $\theta_{E1(B)}$ represents the phase of $y_{E1}$ without considering the interference of $d_{E0}$ and noise. Once again, the equalities in (Eq. 37) and (Eq. 38) support the result in (Eq. 35).

$$p(\theta_{d_B}|\theta_{E1(B)}, \theta_{E1,F(A)}) = p(\theta_{d_B}) \quad \text{(Eq. 37)}$$

$$H(\theta_{d_B}|\theta_{E1(B)}, \theta_{E1,F(A)}) = H(\theta_{d_B}) \quad \text{(Eq. 38)}$$

In an embodiment, as demonstrated in (Eq. 32) and (Eq. 35), the implementation of the proposed disclosure for communication scenario 2 ensures full secrecy of $d_B$ inside (45) and outside (47) of the network. In this application scenario, the secrecy constraint was only defined to $d_B$, however, the proposed disclosure has enough room to be applied for more demanding secrecy requirements, such for instance protecting also $d_{E0}$ in (46) and (47).

Alternatively, the function r(k) can be defined by a predetermined constellation. Considering a set of M points of equal magnitude extracted from a given constellation and indexed by integers between 1 and M, the value of r(k) (equation (Eq. 39)) for a given point (symbol) defined by the index p∈{1, . . . , M} may be randomly selected for the more general case of the set $$S = \left\{ [\phi(n) - \phi(p)] \frac{M}{2\pi} : n \in \{1, \ldots, M\} \right\}$$

which corresponds to a random phase difference between point n with the phase φ(n) and point p with phase φ(p), where points p and n have the same magnitude. When a random rotation is applied, in this more general case, a random rotation by a certain random number of symbols is thus carried out.

The term "comprising" whenever used in this document is intended to indicate the presence of stated features, integers, steps, components, but not to preclude the presence or addition of one or more other features, integers, steps, components or groups thereof.

Flow diagrams of particular embodiments of the presently disclosed methods are depicted in figures. The flow diagrams illustrate the functional information one of ordinary skill in the art requires to perform said methods required in accordance with the present disclosure.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The disclosure should not be seen in any way restricted to the embodiments described and a person with ordinary skill in the art will foresee many possibilities to modifications thereof. The above described embodiments are combinable. The following claims further set out particular embodiments of the disclosure.

The invention claimed is:

1. A transmitter device i for a secure channel training method applied to a power domain non-orthogonal multiple access system comprising:
    a plurality of transmitters and receivers, wherein the transmitter device i is configured to:
        estimate a channel between receiver device j and transmitter device i;
        estimate a channel between receiver device j+1 and transmitter device i;
        apply a channel processing block to encode the estimated channels between transmitter device i and receiver devices j and j+1; and
        transmit a signal of said encoded channels to receiver device j+1 containing information regarding the estimated channels between transmitter device i and receiver's devices j and j+1.

2. The transmitter device i according to claim 1, wherein the transmitter device i is further configured to apply said channel processing block to the estimated channels between transmitter device i and receiver devices j and j+1, by applying the following encoding operation:

$$x_{F(i)}(k) = F_i[p_H h_{j+1,i}(k), h_{j,i}(k), r(k)]$$

$$= p_H |h_{j+1,i}(k)| |h_{j,i}(k)|^{-2} e^{j\left[\theta_{j,i}(k) - 2\theta_{j+1,i}(k) - r(k)\frac{2\pi}{M}\right]}$$

where $F_i(.)$ defines the processing function to be applied, $h_{j,i}(k)$ is the small-scale channel fading coefficient between transmitter device i and receiver device j, $h_{j+1,i}(k)$ is the small-scale channel fading coefficient between transmitter device i and receiver device j+1, $|h_{j,i}(k)|$ is the magnitude of the channel between transmitter device i and receiver device j, $|h_{j+1,i}(k)|$ is the magnitude of the channel between transmitter device i and receiver device j+1, $\theta_{j,i}(k)$ is the phase of the channel $h_{j,i}(k)$ between transmitter device i and receiver device j, $\theta_{j+1,i}(k)$ is the phase of the channel $h_{j+1,i}(k)$ between transmitter device i and receiver device j+1, $x_{F(i)}(k)$ is the signal to be sent by transmitter device i containing the encoded channels between transmitter device i and receivers devices j and j+1, $p_H$ corresponds to a power allocation coefficient allocated to receiver j+1, r(k) is defined as 0 or as an integer random variable defined in the interval [1, M], wherein M is the order of a digital modulation for which the system is configured and k defines the system realization index.

3. A receiver device j+1 for a secure channel training method applied to a power domain non-orthogonal multiple access system comprising
    a plurality of transmitters and receivers, wherein the receiver device j+1 is configured to:
        receive a signal sent by transmitter device i containing the encoding of estimated channels between transmitter device i and receiver devices j and j+1; and
        apply a channel acquisition block to the signal containing the encoding of the estimated channels between transmitter device i and receiver devices j and j+1.

4. The receiver device j+1 according to claim 3, wherein the receiver device j+1 is further configured to apply said channel acquisition block to the signal sent by transmitter device i containing the encoding of the estimated channels between transmitter device i and receiver devices j and j+1, by applying the following decoding operation:

$$R_i[y_{j+1,F(i)}(k), \alpha_{j+1}p_H] = \left(\frac{|y_{j+1,F(i)}(k)|}{\alpha_{j+1}p_H}\right)^{1/2} e^{-j\theta_{j+1,F(i)}(k)}$$

$$= h_{j+1,i}(k)h_{j,i}(k)^{-1}e^{j\left[r(k)\frac{2\pi}{M}\right]},$$

where $$y_{j+1,F(i)}(k) = \alpha_{j+1}x_{F(i)}(k)h_{j+1,i}(k)$$

$$= \alpha_{j+1}p_H\left[|h_{j+1,i}(k)||h_{j,i}(k)|^{-1}\right]^2 e^{j\left[\theta_{j,i}(k)-\theta_{j+1,i}(k)-r(k)\frac{2\pi}{M}\right]}$$

is the received signal at receiver device j+1 containing the encoding of the channels between transmitter device i and receiver devices j and j+1, $|y_{j+1,F(i)}(k)|$ is the magnitude of the received signal $y_{j+1,F(i)}(k)$, $\theta_{j+1,F(i)}(k)$ is the phase of $y_{j+1,F(i)}(k)$, $\alpha_{j+1}$ defines a constant path-loss coefficient for receiver j+1, $h_{j,i}(k)$ is the small-scale channel fading coefficient between transmitter device i and receiver device j, $h_{j+1,i}(k)$ is the small-scale channel fading coefficient between transmitter device i and receiver device j+1, $p_H$ is a power allocation coefficient allocated to receiver j+1, $|h_{j,i}(k)|$ is the magnitude of the channel between transmitter device i and receiver device j, $|h_{j+1,i}(k)|$ is the magnitude of the channel between transmitter device i and receiver device j+1, $\theta_{j,i}(k)$ is the phase of the channel $h_{j,i}(k)$ between transmitter device i and receiver device j, $\theta_{j+1,i}(k)$ is the phase of the channel $h_{j+1,i}(k)$ between transmitter device i and receiver device j+1, r(k) is defined as 0 or as an integer random variable defined in the interval [1, M], wherein M is the order of a digital modulation for which the system is configured, and k defines the system realization index.

5. The receiver device j+1 according to claim 3, wherein the receiver device j+1 is further configured to recover the ratio of the encoded estimated channels between transmitter device i and receiver devices j and j+1.

6. A system for a secure channel training method applied to a power domain, non-orthogonal, multiple access system, comprising:
a plurality of transmitters according to claim 1 and a plurality of receivers according to claim 3.

7. The system according to claim 6, further comprising a jamming transmitter, wherein the jamming transmitter is configured for emitting a discrete jamming signal aligned with the transmissions of transmitter device i having the same order of a digital modulation for which the system is configured.

8. The system according to claim 7, wherein the jamming transmitter comprises a transmitter configured according to claim 2 and wherein r(k) is defined as 0.

9. The system according to claim 8, wherein the digital modulation for which the system is configured is a discrete square QAM constellation.

10. The system according to claim 6, wherein a digital modulation for which the system is configured is a discrete PSK constellation of order M with a constant phase shift Δφ=2π/M between any consecutive pair of points in the constellation and wherein r(k) is defined as an integer random variable distributed uniformly in the interval set [1, M].

11. The receiver device j+1 according to claim 4, wherein the receiver device j+1 is further configured to recover the ratio of the encoded estimated channels between transmitter device i and receiver devices j and j+1.

12. The system of claim 6, wherein the jamming transmitter comprises a transmitter according to claim 1.

* * * * *